United States Patent [19]

Zutrauen

[11] 4,056,316

[45] Nov. 1, 1977

[54] METHOD AND APPARATUS FOR MAKING A PRINT OF AN OBJECT

[76] Inventor: Howard C. Zutrauen, 119-05 103rd Ave., Richmond Hill, N.Y. 11419

[21] Appl. No.: 675,306

[22] Filed: Apr. 9, 1976

[51] Int. Cl.² ........................ G03B 27/32; G03B 35/14
[52] U.S. Cl. ..................................... 355/22; 350/137; 354/115; 355/77
[58] Field of Search ..................... 355/22, 17; 354/112, 354/115; 350/137

[56] References Cited

U.S. PATENT DOCUMENTS 3,515,454  6/1970  Paganelli ............................. 350/137

Primary Examiner—Richard A. Wintercorn
Attorney, Agent, or Firm—Daniel Jay Tick

[57] ABSTRACT

A method of making a print of an object, photographed by a stereo camera to provide first and second stereo transparencies thereof, comprises copying one of the first and second transparencies to prepare a third transparency. The first transparency and the third transparency are optically superimposed on each other to provide a first combination of light. A line screen negative is prepared having a plurality of black lines of equal thickness in parallel relation equidistantly spaced from each other by clear lines equal in thickness to the black lines. Photosensitive material is exposed to the first combination of light via the line screen negative to provide a first exposure. The second transparency and the third transparency are optically superimposed on each other to provide a second combination of light. The line screen negative is shifted in position by the thickness of a black line thereof on the first exposure. The photosensitive material is re-exposed to the second combination of light via the shifted line screen negative to expose the lines of the first exposure covered by the black lines of the negative in providing the first exposure to provide a complete exposure. The complete exposure is printed as a single print. The print is lenticulated whereby it appears to be three-dimensional to a human eye.

9 Claims, 12 Drawing Figures

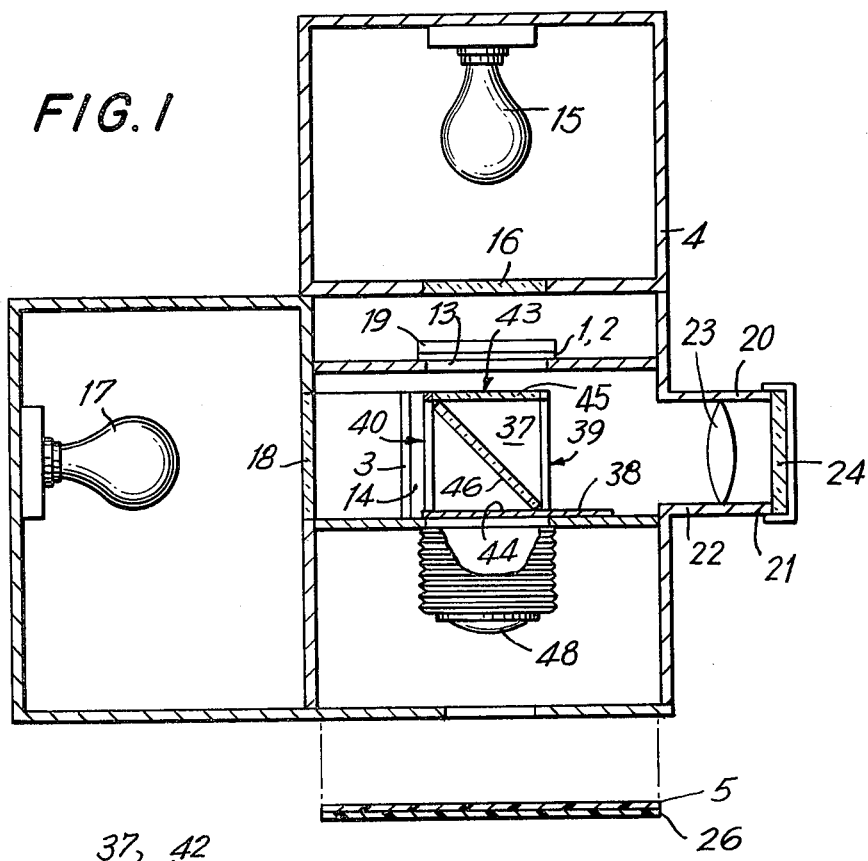
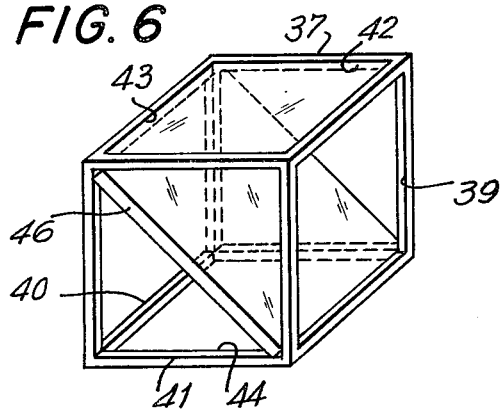
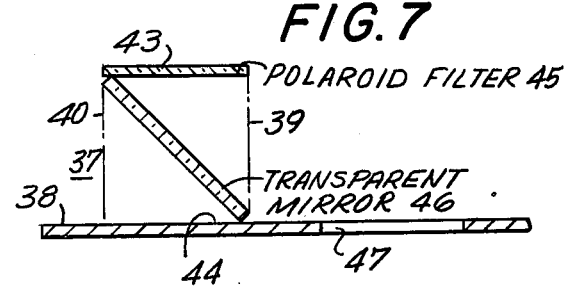
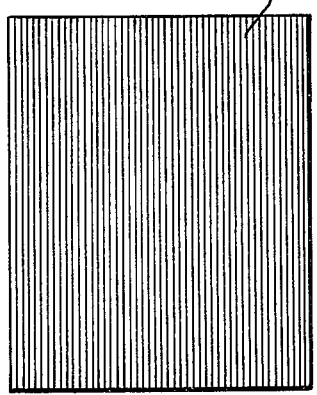
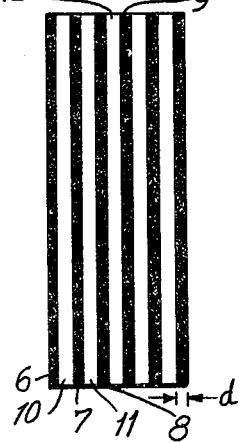
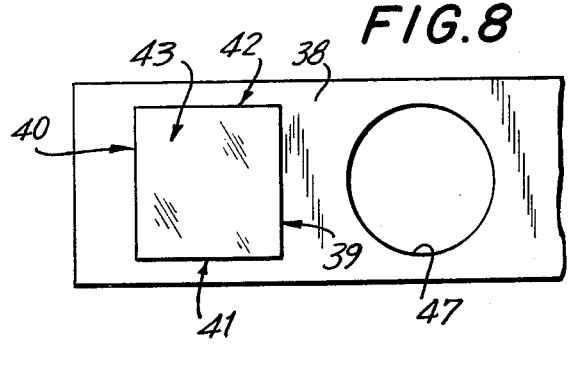

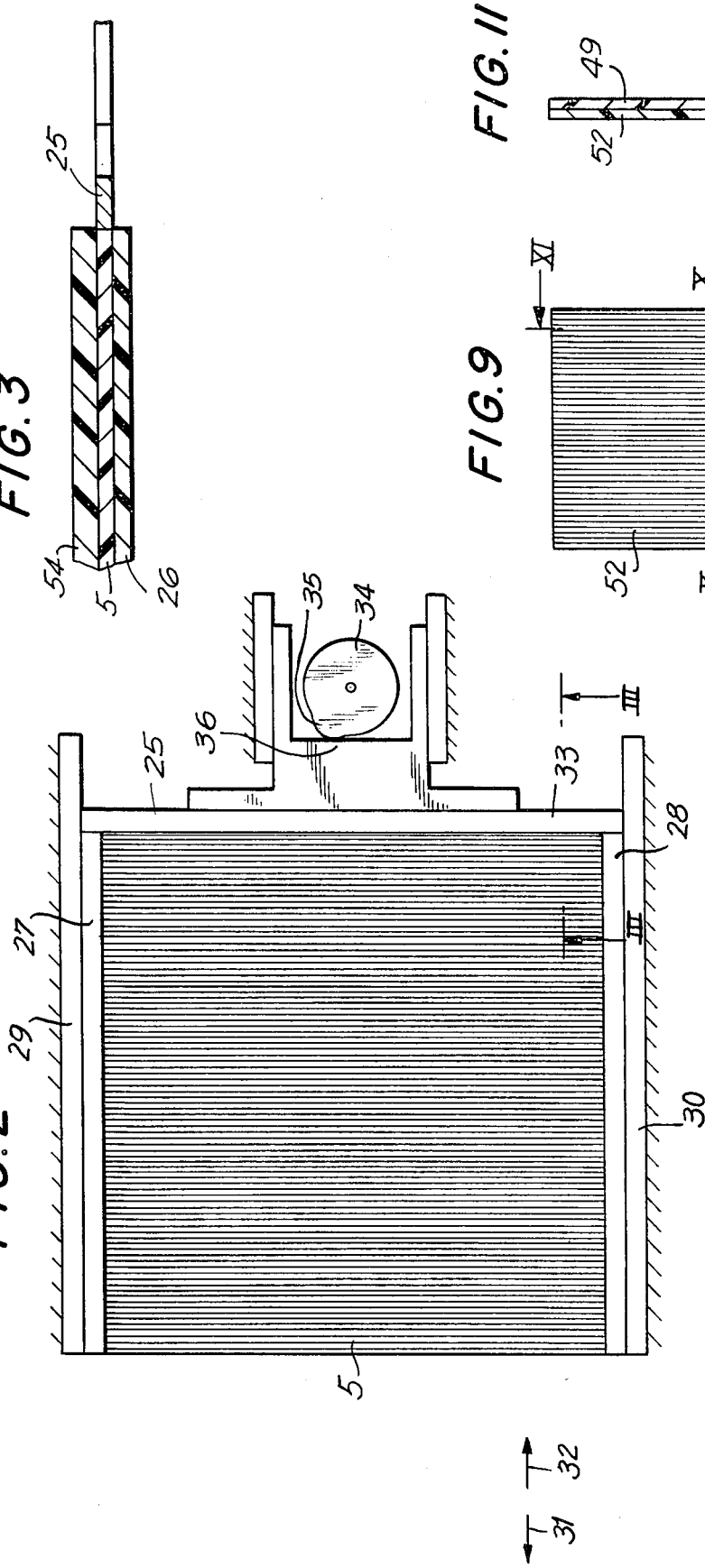
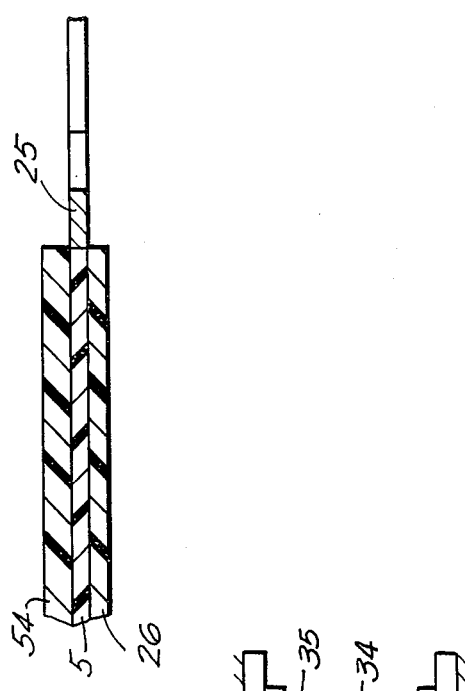
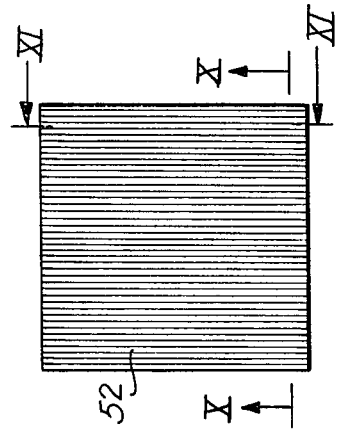
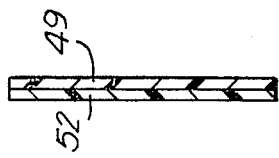
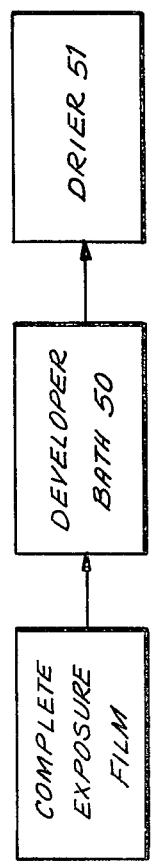

METHOD AND APPARATUS FOR MAKING A PRINT OF AN OBJECT

BACKGROUND OF THE INVENTION

The present invention relates to a method and apparatus for making a print of an object. More particularly, the invention relates to a method and apparatus for making a print of an object, photographed by a stereo camera to provide a pair of stereo transparencies thereof, which print appears to the human eye to be three-dimensional.

The principal object of the invention is to provide a method of making a print of an object, which print appears to the human eye to be three-dimensional.

An object of the invention is to provide apparatus for making a print of an object, which print appears to the human eye to be three-dimensional.

Another object of the invention is to provide a method of making a print of an object, which method has few steps which are accomplished with facility, convenience and rapidity.

Still another object of the invention is to provide a method of making a print of an object, which method is simply undertaken and provides, with facility and convenience, a print which appears to the human eye to be three-dimensional.

Yet another object of the invention is to provide apparatus for making a print of an object, which apparatus is of simple structure and is inexpensive in manufacture.

Another object of the invention is to provide apparatus of simple structure for making, with efficiency, effectiveness and reliability, a print of an object, which print appears to the human eye to be three-dimensional.

BRIEF SUMMARY OF THE INVENTION

In accordance with the invention, a method of making a print of an object, photographed by a stereo camera to provide first and second stereo transparencies thereof, which print appears so the human eye to be three-dimensional, comprises copying one of the first and second transparencies to prepare a third transparency. The first transparency provided by the stereo camera and the third transparency are optically superimposed on each other to provide a first combination of light. A line screen negative is prepared having a plurality of black lines of equal thickness in parallel relation equidistantly spaced from each other by clear lines equal in thickness to the black lines. Photosensitive material is exposed to the first combination of light via the line screen negative to provide a first exposure. The second transparency provided by the stereo camera and the third transparency are optically superimposed on each other to provide a second combination of light. The line screen negative is shifted in position by the thickness of a black line thereof on the first exposure. The photosensitive material is re-exposed to the second combination of light via the shifted line screen negative to expose the lines of the first exposure covered by the black lines of the negative in providing the first exposure to provide a complete exposure. The complete exposure is printed as a single print. The print is lenticulated whereby it appears to be three-dimensional to a human eye.

The print is lenticulated via the same number of lines per unit length as the lines per unit length of the line screen negative.

In accordance with the invention, apparatus for making a print of an object, photographed by a stereo camera to provide first and second stereo transparencies thereof, which print appears to the human eye to be three-dimensional, comprises a third transparency which is a copy of one of the first and second transparencies. Optical means first superimposes the first transparency provided by the stereo camera and the third transparency on each other to provide a first combination of light and then superimposes the second transparency provided by the stereo camera and the third transparency on each other to provide a second combination of light. A line screen negative has a plurality of black lines of equal thickness in parallel relation equidistantly spaced from each other by clear lines equal in thickness to the black lines. Viewing means provides viewing of the transparencies in the optical means to permit selective positioning thereof to insure exact superimposition thereof. Positioning means first exposes photosensitive material to the first combination of light via the line screen negative to provide a first exposure and then shifts the line screen negative in position by the thickness of a black line thereof on the first exposure, and re-exposes the photosensitive material to the second combination of light via the shifted line screen negative to expose the lines of the first exposure covered by the black lines of the negative in providing the first exposure to provide a complete exposure. Printing means prints the complete exposure as a single print. Lenticular means is provided on the print whereby it appears to be three-dimensional to a human eye.

The lenticular means has the same number of lines per unit length as the lines per unit length of the line screen negative.

The lengticular means comprises a sheet of transparent material having a plurality of spaced parallel lines formed therein by corrugations formed in one surface of the sheet. The sheet has a predetermined number of lines per unit length.

The optical means positions the transparencies substantially perpendicularly to each other. The viewing means comprises a substantially tube-like viewing member extending substantially perpendicularly from the optical device and having spaced opposite first and second ends. The viewing member is open at its first and second ends. Viewing lens means and an adjustable polaroid filter are mounted in the viewing member at the first end thereof. The second end of the viewing member is affixed to the optical device.

The viewing lens means comprises a platform slidably mounted in the optical device. A substantially cubic frame mounted on the platform has a first pair of spaced parallel open sides in planes substantially perpendicular to the platform. A second pair of spaced parallel closed sides are substantially perpendicular to the first pair of sides and join the first pair of sides. A third pair of spaced parallel sides, including a top and a bottom juxtaposed with the platform, are substantially perpendicular to the first and second pairs of sides and join said sides. A first viewing means is provided in the top for viewing a first of the transparencies. Transparent mirror means extends at substantially 45° with the platform between the juncture of the bottom of the side of the first pair of sides closest to the sighting lens means and the juncture of the top and the other of the first pair of sides. The second of the transparencies is provided at the other of the first pair of sides. A hole is formed through the platform to permit exposure of the transparencies after viewing of said transparencies.

In accordance with the invention, a viewing device for simultaneously viewing first and second items positioned substantially perpendicularly to each other, comprises a viewing lens means comprising a platform slidably mounted in the optical device. A substantially cubic frame mounted on the platform has a first pair of spaced parallel open sides in planes substantially perpendicular to the platform. A second pair of spaced parallel closed sides are substantially perpendicular to the first pair of sides and join the first pair of sides. A third pair of spaced parallel sides includes a top and a bottom juxtaposed with the platform, and substantially perpendicular to the first and second pairs of sides and joining said sides. A first viewing means is provided in the top for viewing a first of the items. Transparent mirror means extends at substantially 45° with the platform between the juncture of the bottom and a viewing side of the first pair of sides and the juncture of the top and the other of the first pair of sides. The second of the items is provided at the other of the first pair of sides thereby permitting the first and second items to be viewed in superimposed relation with each other. A hole is formed through the platform to permit exposure of the items after they have been viewed.

Each of the first and second items comprises a photographic transparency.

BRIEF DESCRIPTION OF THE DRAWINGS

In order that the invention may be readily carried into effect, it will now be described with reference to the accompanying drawings, wherein:

FIG. 1 is a schematic diagram, partly in section, of an embodiment of the apparatus of the invention for making a print of an object;

FIG. 2 is a top plan view of an embodiment of the positioning device of the apparatus of the invention;

FIG. 3 is a cross-sectional view, on an enlarged scale, taken along the lines III—III, of FIG. 2;

FIG. 4 is a top plan view of the line screen negative of the apparatus of the invention;

FIG. 5 is a top plan view, on an enlarged scale, of part of the line screen negative of FIG. 4;

FIG. 6 is a perspective view of an embodiment of part of the viewing lens device of the viewing device of the invention;

FIG. 7 is a cross-sectional view of an embodiment of the viewing lens device of the viewing device of the invention;

FIG. 8 is a top plan view of the embodiment of FIG. 7;

FIG. 9 is a front view of the lenticular sheet and the finished print produced by the method and apparatus of the invention;

FIG. 10 is a view, taken along the lines X—X of FIG. 9;

FIG. 11 is a view, taken along the lines XI—XI of FIG. 9; and

FIG. 12 is a block diagram of the printing device of the apparatus of the invention.

In the FIGS., the same components are identified by the same reference numerals.

DETAILED DESCRIPTION OF THE INVENTION

The method of the invention makes a print of an object, which print appears to the human eye to be three-dimensional. The object is photographed by a stereo camera of any suitable known type such as, for example, a Duplex 120 Stereo Camera, a Kodak Stereo F:3.5 Synch, a Revere Stereo F:3.5 Rfdr, or the like. Furthermore, any 35mm camera may be converted into a 3d stereo camera by a commercially available prism stereo attachment. The stereo camera provides a pair of stereo transparencies in a known manner.

The method of the invention comprises the step of copying one of the first and second transparencies provided by the stereo camera to prepare a third transparency. This is accomplished by any suitable known means.

The next step of the method of the invention is to optically superimpose the first transparency provided by the stereo camera and the third transparency on each other to provide a first combination of light. A line screen negative is prepared by any suitable means such as, for example, photographic means, having a plurality of black lines of equal thickness in parallel relation equidistantly spaced from each other by clear lines equal in thickness to the black lines.

In the next step of the method of the invention, photosensitive material is exposed to the first combination of light via the line screen negative to provide a first exposure.

The second transparency provided by the stereo camera and the third transparency are then optically superimposed on each other to provide a second combination of light.

In the next step of the method of the invention, the line screen negative is shifted in position by the thickness of a black line thereof on the first exposure.

The photosensitive material is then re-exposed to the second combination of light via the shifted line screen negative to expose the lines of the first exposure covered by the black lines of the negative in providing the first exposure to provide a complete exposure.

The complete exposure is printed as a single print.

In the last step of the invention, the print is lenticulated, whereby it appears to be three-dimensional to a human eye. The print is lenticulated via the same number of lines per unit length as the lines per unit length of the line screen negative.

The steps of the method of the invention for making a print of an object are accomplished by the apparatus of the FIGS., as hereinafter described.

The apparatus of the invention makes a print of an object which is first photographed by a stereo camera of any suitable type to provide first and second stereo transparencies 1 and 2 of the object (FIG. 1).

A third transparency 3 (FIG. 1) is then prepared as a copy of either of the first and second transparencies 1 and 2 by any suitable known photographic means.

An optical device 4 first superimposes the first transparency 1 provided by the stereo camera and the third transparency 3 on each other to provide a first combination of light.

A line screen negative 5 (FIGS. 1 to 5) has a plurality of black lines 6, 7, 8, 9, and so on (FIG. 5), of equal thickness in parallel relation equidistantly spaced from each other by clear lines 10, 11, 12 and so on (FIG. 5), equal in thickness to the black lines. The line screen negative may be produced by any suitable means such as, for example, a photographic method. The line screen negative has a predetermined number of lines per unit length such as, for example, 44 lines per inch.

The optical device 4 positions the first and third transparencies 1 and 3 substantially perpendicularly to each other. As shown in FIG. 1, the first transparency 1 is supported over an opening 13 and the third transparency 3 is supported in a substantially vertical transparency holder 14 of any suitable known type. The first transparency 1 is illuminated by light from a first light source 15 of the optical device 4 via a suitable condenser lens 16 which provides even distribution of light from said first light source and the third transparency 3 is illuminated by light from a second light source 17 via a suitable condenser lens 18 (FIG. 1). A filter drawer 19 is interposed between the condenser lens 16 and the transparency 1 or 2 (FIG. 1). If needed, color correction filters may be placed in the drawer 19 to correct the color balance of the print. Such correction filters may be magenta, cyan or yellow.

In accordance with the invention, a viewing device 20 (FIG. 1) is provided for viewing the first and third transparencies 1 and 3 to permit selective positioning thereof to insure exact superimposition of said transparencies. The viewing device 20 comprises a substantially tube-like viewing member extending substantially perpendicularly from the optical device and having spaced opposite first and second ends 21 and 22, as shown in FIG. 1. The viewing member is open at its first and second ends 21 and 22. A viewing lens 23 is mounted in the viewing member at the first end 21 thereof (FIG. 1). An adjustable polaroid filter 24 is mounted in the viewing member at the first end thereof. The polaroid filter 24 is rotatably mounted. It functions in conjunction with the polaroid filter 43 to regulate the light reaching the eye from the original transparency 1 or 2, which has a higher wattage lamp 15 behind it than the lamp 17 behind the third or duplicate transparency 3. The filter 24 is rotated until both the original and duplicate transparencies 1 or 2 have approximately the same density and make superimposition easier. The filters 24 and 45 are used solely for this superimposing function. The filter 45 is hereinafter described. The second end 22 of the viewing member is affixed to the optical device 4.

A positioning device 25 (FIGS. 2 and 3) first exposes photosensitive material 26 (FIGS. 1 and 3) of any suitable known type such as, for example, photographic film, to the first combination of light via the line screen negative 5 to provide a first exposure. The positioning device 25 is then utilized to shift the line screen negative 5 in position by the thickness of a black line 6, 7, 8, 9, and so on, thereof on the first exposure.

As shown in FIG. 2, the positioning device 25 comprises a clamping arrangement for holding the photosensitive material 26 in a fixed position and for maintaining the line screen negative 5 in juxtaposition with said photosensitive material in a manner whereby said line screen negative may be moved an amount equal to the thickness of one of its black lines. This is accomplished by mounting the line screen negative 5 in a side clamp comprising a pair of clamping members 27 and 28. The clamping members 27 and 28 are slidably mounted in guide members 29 and 30, respectively, for movement in directions of arrows 31 and 32 of FIG. 2, perpendicular to the extension of the lines of the line screen negative 5.

The line screen negative 5 is abutted at one edge by a control member 33. The control member 33 is movable a distance $d$ (FIG. 5) which is equal to the thickness of a black line of the line screen negative 5 in the direction of the arrow 31 of FIG. 2 under the control of a cam device 34. Thus, when the cam device 34 is turned so that its extending portion 35 abuts its housing component 36, the control member 33 is moved a distance $d$ in the direction of the arrow 31, thereby moving the line screen negative 5 such distance.

The first transparency 1 is then removed from the optical device 4 and is replaced by the second transparency 2. The optical device 4 is then utilized to superimpose the second transparency 2 and the third transparency 3 on each other to provide a second combination of light.

The photosensitive material or film 26 is re-exposed to the second combination of light by the positioning device via the shifted line screen negative 5 to expose the lines of the first exposure covered by the black lines of the negative in providing the first exposure to provide a complete exposure. In other words, when the first exposure is produced, the black lines of the line screen negative 5 obstruct the light of the first combination of light and thus leave clear lines in their stead. Thus, when the line screen negative 5 is shifted by the distance $d$, the clear spaces of the first exposure are exposed to the second combination of light and resultant complete exposure is thus a combination of the first exposure on a plurality of spaced parallel lines and the second exposure on the alternate spaced parallel lines.

A viewing lens device 37 (FIGS. 1, 6, 7 and 8) comprises a platform 38 slidably mounted in the optical device 4 (FIGS. 1, 7 and 8). The viewing lens device 37 comprises, as shown in FIG. 6, a substantially cubic frame having a first pair of spaced parallel open sides 39 and 40 in planes substantially perpendicular to the platform 38.

A second pair of spaced parallel closed sides 41 and 42 are substantially perpendicular to the first pair of sides 39 and 40 and join said first pair of sides, as shown in FIGS. 6 and 8. A third pair of spaced parallel sides include a top 43 and a bottom 44 juxtaposed with the platform 38, and are substantially perpendicular to the first and second pairs of sides and joining said sides (FIGS. 6, 7 and 8). A polaroid filter 45 is mounted in the top 43 (FIGS. 6 and 7) for viewing the first transparency 1 and then the second transparency 2 (FIG. 1).

A transparent mirror 46 (FIGS. 1, 6 and 7) extends at substantially 45° with the platform 38 between the juncture of the bottom 44 and the side 39 of the first pair of sides closest to the viewing lens 23 and the juncture of the top 43 and the other side 40 of said first pair of sides. The third transparency 3 is provided at the side 40 (FIGS. 6 and 7). A hole 47 is formed through the platform 38 (FIGS. 7 and 8) to permit exposure of the transparencies after viewing thereof. The hole 47 is spaced from the frame.

The optical device 4 includes a lens 48 (FIG. 1) for directing light passing through the first and second transparencies 1 and 2 onto the photosensitive material 26.

The complete exposure is printed as a single print 49 (FIGS. 10 and 11) by any suitable known method or means such as, for example, by immersion in a suitable developer bath 50 and then suitable drying in a drier 51, as shown in FIG. 12.

The single print 49 is lenticulated by a lenticular sheet 52 (FIGS. 9, 10 and 11) which is positioned on said print and makes said print appear to be three-dimensional to a human eye. The lenticular sheet 52 may comprise any suitable known sheet having the same configuration as the line screen negative 5 and has the same number of lines per unit length formed therein as does the line screen negative. The lenticular sheet 52 is commercially available as a substantially rigid sheet of transparent plastic having a plurality of spaced parallel lines formed therein by corrugations 53 formed in one surface of said sheet (FIG. 10).

The viewing device 20 of the invention is used to observe two transparencies such as, the first and third transparencies 1 and 3, for example, in superimposed relation to each other and permits the user to adjust either of the transparencies in position, while viewing same, to insure exact superimposition of said transparencies.

A transparent member 54 of any suitable type such as, for example, glass or plastic, is juxtaposed with the line screen negative 5, as shown in FIG. 3, to keep said negative flat.

When a person looks at the print 49 via the lenticular sheet 52, he or she sees a clear, distinct and beautifully natural three-dimensional picture.

The viewing lens device 37 is moved by the user in adjusting the transparencies 1 and 2 and 3 for superimposition. The viewing lens device 37 is moved into the line of sight of the viewing lens 23 (FIG. 1) in order to provide such superimposition. After the viewing lens device has been used to assist in superimposing the transparencies, the user shifts, slides or moves it so that the hole 47 through the platform 38 is positioned in the beam of light through the opening 13. This permits exposures to be made without obstruction by any of the components of the viewing lens device 37.

The optical device or enlarger 4 is mounted on an adjustable stand from a base on which the line screen negative 5 and the photosensitive material 26 rest. Thus, the distance between the optical device 4 and the line screen negative 5 and photosensitive material 26 is proportionately greater than that indicated in FIG. 1.

While the invention has been described by means of a specific example and in a specific embodiment, I do not wish to be limited thereto, for obvious modifications will occur to those skilled in the art without departing from the spirit and scope of the invention.

I claim:

1. A method of making a print of an object, photographed by a stereo camera to provide first and second stereo transparencies thereof, which print appears to the human eye to be three-dimensional, said method comprising the steps of
   copying one of the first and second transparencies to prepare a third transparency;
   optically superimposing the first transparency provided by the stereo camera and the third transparency on each other to provide a first combination of light;
   preparing a line screen negative having a plurality of black lines of equal thickness in parallel relation equidistantly spaced from each other by clear lines equal in thickness to the black lines;
   exposing photosensitive material to the first combination of light via the line screen negative to provide a first exposure;
   optically superimposing the second transparency provided by the stereo camera and the third transparency on each other to provide a second combination of light;
   shifting the line screen negative in position by the thickness of a black line thereof on the first exposure;
   re-exposing the photosensitive material to the second combination of light via the shifted line screen negative to expose the line of the first exposure covered by the black lines of the negative in providing the first exposure to provide a complete exposure;
   printing the complete exposure as a single print; and
   lenticulating the print whereby it appears to be three-dimensional to a human eye.

2. A method as claimed in claim 1, wherein the print is lenticulated via the same number of lines per unit length as the lines per unit length of the line screen negative.

3. Apparatus for making a print of an object, photographed by a stereo camera to provide first and second stereo transparencies thereof, which print appears to the human eye to be three-dimensional, said apparatus comprising
   a third transparency which is a copy of one of the first and second transparencies;
   optical means for first superimposing the first transparency provided by the stereo camera and the third transparency on each other to provide a first combination of light and for then superimposing the second transparency provided by the stereo camera and the third transparency on each other to provide a second combination of light;
   a line screen negative having a plurality of black lines of equal thickness in parallel relation equidistantly spaced from each other by clear lines equal in thickness to the black lines;
   viewing means for viewing the transparencies in the optical means to permit selective positioning thereof to insure exact superimposition thereof;
   positioning means for first exposing photosensitive material to the first combination of light via the line screen negative to provide a first exposure and for then shifting the line screen negative in position by the thickness of a black line thereof on the first exposure, and re-exposing the photosensitive material to the second combination of light via the shifted line screen negative to expose the lines of the first exposure covered by the black lines of the negative in providing the first exposure to provide a complete exposure;
   printing means for printing the complete exposure as a single print; and
   lenticular means on the print whereby it appears to be three-dimensional to a human eye.

4. Apparatus as claimed in claim 3, wherein the lenticular means has the same number of lines per unit length as the lines per unit length of the line screen negative.

5. Apparatus as claimed in claim 3, wherein said lenticular means comprises a sheet of transparent material having a plurality of spaced parallel lines formed therein by corrugations formed in one surface of the sheet, said sheet having a predetermined number of lines per unit length.

6. Apparatus as claimed in claim 3, wherein the optical means positions the transparencies substantially perpendicularly to each other, and the viewing means comprises a substantially tube-like viewing member extending substantially perpendicularly from the optical device and having spaced opposite first and second ends, said viewing member being open at its first and second ends, viewing lens means and adjustable polaroid filter means mounted in the viewing member at the first end thereof, the second end of the viewing member being affixed to the optical device, said viewing lens means comprising a platform slidably mounted in the optical device and a substantially cubic frame mounted on the platform and having a first pair of spaced parallel open sides in planes substantially perpendicular to the platform, a second pair of spaced parallel closed sides substantially perpendicular to the first pair of sides and joining said first pair of sides, a third pair of spaced parallel sides including a top and a bottom juxtaposed with the platform and substantially perpendicular to the first and second pairs of sides and joining said sides, a hole formed through the platform in spaced relation with the frame, first viewing means in the top for viewing a first of the transparencies, and transparent mirror means extending at substantially 45° with the platform between the juncture of the bottom and the side of the first pair of sides closest to the viewing lens means and the juncture of the top and the other of the first pair of sides, the second of the transparencies being provided at said other of said first pair of sides.

7. A viewing device for simultaneously viewing in two-dimensions first and second items positioned substantially perpendicularly to each other in spaced relation, said viewing device comprising a platform slidably mounted in proximity with the items, a substantially cube-like frame mounted on the platform and having a first pair of spaced parallel open sides in planes substantially perpendicular to the platform, a second pair of spaced parallel closed sides substantially perpendicular to the first pair of sides and joining said first pair of sides, a third pair of spaced parallel sides including a top and a bottom juxtaposed with the platform and substantially perpendicular to the first and second pairs of sides and joining said sides, first viewing means in the top for viewing a first of the items, and a single transparent mirror extending at substantially 45° with the platform between the juncture of the bottom and a viewing side of the first pair of sides and the juncture of the top and the other of the first pair of sides, the second of the items being provided at said other of said first pair of sides thereby permitting the first and second items to be viewed in superimposed relation with each other in two-dimensions.

8. A viewing device as claimed in claim 7, wherein each of the first and second items comprises a photographic transparency.

9. A viewing device as claimed in claim 7, wherein the platform has a hole formed therethrough in spaced relation with the frame for permitting light from the items to pass therethrough.

* * * * *